March 19, 1935.  A. Y. DODGE  1,994,814

BRAKE AND CLUTCH OPERATING MECHANISM

Original Filed March 10, 1924

INVENTOR.
A. Y. Dodge
BY H. O. Clayton
ATTORNEY

Patented Mar. 19, 1935

1,994,814

UNITED STATES PATENT OFFICE 1,994,814

BRAKE AND CLUTCH OPERATING
MECHANISM

Adiel Y. Dodge, South Bend, Ind., assignor to
Bendix Brake Company, South Bend, Ind., a
corporation of Illinois Original application March 10, 1924, Serial No.
697,982. Divided and this application August
16, 1929, Serial No. 386,363

1 Claim. (Cl. 192—13)

This invention relates to brakes and is illustrated as embodied in a hydraulic control mechanism for a brake of the internal expanding type.

An object of the invention is to provide a simple, compact and yet very effective hydraulic power transmission for a set of brakes for the four wheels of a vehicle.

A further object of my invention is the provision of an improved combined brake and clutch control mechanism wherein the front set of brakes and the rear set of brakes are actuated independently of each other and in which two pedals are required, one pedal operating the clutch and front brakes and the other pedal operating the rear brakes. By this construction, the driver may apply either the front brakes or the rear brakes independently of each other, or may apply both sets simultaneously.

Further objects and features of the invention, including specific details of construction and novel combinations of parts will become apparent from the following detailed description of a preferred embodiment of my invention illustrated in the accompanying drawing, in which.

Figure 1:
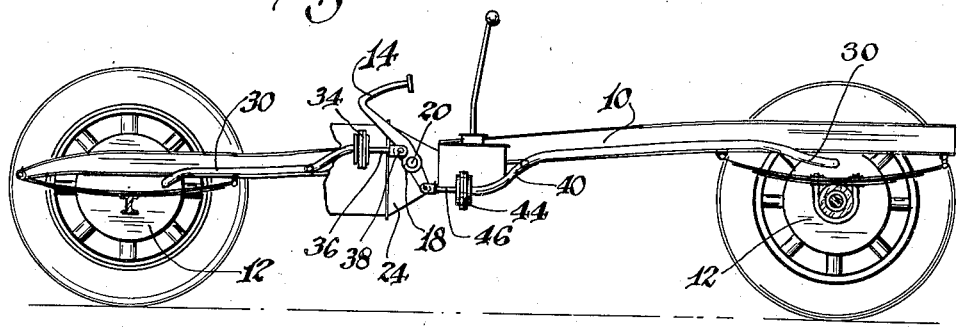
Figure 1 is a diagrammatic side elevational view showing in a general way the clutch and brake hydraulic control mechanism.

Referring now to the drawing, the construction shown comprises a chassis frame 10 supported by four wheels, each wheel being provided with an internal expanding brake 12.

My invention resides in a particular operating or control mechanism for actuating vehicle brakes, the control co-operating with the clutch mechanism for the power plant of a motor vehicle.

Figure 2:
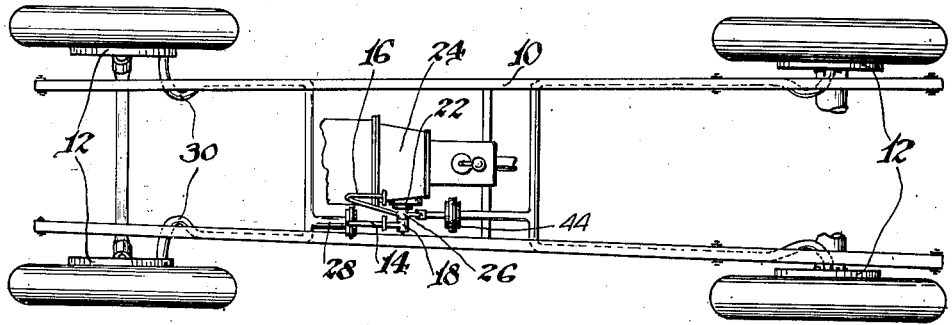
Figure 2 is a diagrammatic plan view of the chassis and control parts illustrated in Figure 1.
Figure 4:
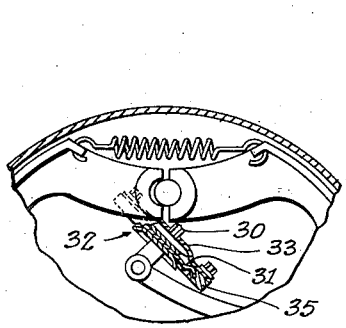
Figure 3 is a fragmentary enlarged view showing in more detail the preferred embodiment of the combined clutch and brake control and Figure 4 is a fragmentary enlarged view showing one of the wheel brake actuators.
Figure 3:
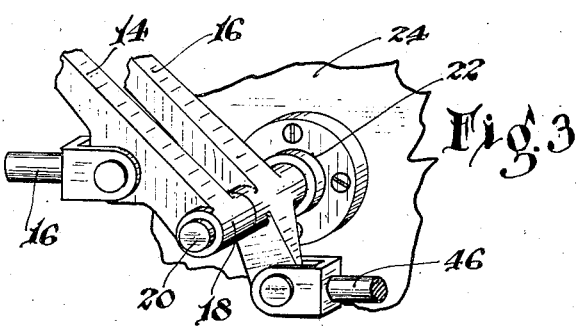

Referring particularly to the disclosure in Figures 1 and 2, there is provided the usual clutch and service brake pedals 14 and 16, respectively, the former actuating, at its hub 18, shaft 20 mounted in bearing 22 secured to transmission housing 24 and the latter sleeved at its fulcrum 26 over said shaft.

In order that the front brakes may be actuated, I suggest the employment of a hydraulic control structure which may comprise tubing 28 having branches 30 extending to the brakes and more particularly to the actuators 32. These actuators may each comprise a rigid plate 33 secured to the support plate of the brake, a flexible diaphragm 31 of fluid proof material, forming with the plate 33 a fluid tight compartment, and a retaining ring 35 clampingly engaging the edge of the flexible diaphragm 31 to hold it snugly against the rigid plate 33.

The particular brake actuated by my control forms the subject-matter of my co-pending application No. 697,982, filed March 10, 1924, the instant case being a division thereof.

The liquid within the tubing 28 is subjected to pressure to actuate the brakes by means of the fluid pressure actuator 34, the piston of which is connected to the clutch pedal 14 by means of a link 36 pivoted to the pedal at 38. Similarly the transmission from the service pedal 16 to the rear brakes may comprise tubing 40 connected to actuators at the brakes, the liquid therein being actuated by pressure derived from the actuator 44, the piston of which is connected to the lower end of the pedal by a link 46.

A very simple and efficient power transmission is thus provided employing the usual clutch and service pedals, either one or both sets of brakes being operable at the will of the driver.

The operation of the combined brake and clutch control mechanism is as follows: With the parts in the position shown, should the operator desire to disengage the clutch, he pushes forward on the pedal 14 in the usual manner and thus operates the clutch through the shaft 20. The first movement of the pedal causes the clutch to disengage but on account of the necessity that the front brake actuators 32 shall first take up the usual lining clearance between the brake shoes and the drum, the front brakes are not engaged during the first part of the movement. However, should the operator push the pedal even further forward, the brake shoes will become engaged and will apply the brakes to the front wheels. Should the operator desire to brake the rear wheels, he pushes forward on the pedal 16. By proper proportioning of pressure on the pedals 14 and 16, he may vary the braking pressure applied to the front and rear wheels as may seem most advantageous to him.

While one illustrative embodiment has been described in detail, it is not my intention to limit the scope of the invention to that particular embodiment, or otherwise than by the terms of the appended claim.

I claim:

Hydraulic operating mechanism for the brakes on the four wheels of a vehicle comprising, in combination, a clutch, a set of brakes for the front wheels, a set of brakes for the rear wheels, two pedals, an operative connection from one of said pedals to the clutch and hydraulic connections from said pedal to one of said sets of brakes, and hydraulic operative connections from the other pedal to the other set of brakes, said last-mentioned pedal constituting a lever fulcrumed on the connection between said first-mentioned pedal and the clutch.

ADIEL Y. DODGE.